US007824782B2

(12) United States Patent
Kamiya et al.

(10) Patent No.: US 7,824,782 B2
(45) **Date of Patent: *Nov. 2, 2010**

(54) MOLDED ARTICLE LOCATED IN THE BEAM PATH OF RADAR DEVICE, AND METHOD OF MANUFACTURING THE SAME

(75) Inventors: Itsuo Kamiya, Toyota (JP); Sumio Kamiya, Toyota (JP); Izumi Takahashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 834 days.

This patent is subject to a terminal disclaimer.

(21) Appl. No.: 10/910,374

(22) Filed: Aug. 4, 2004

(65) Prior Publication Data

US 2005/0031897 A1 Feb. 10, 2005

(30) Foreign Application Priority Data

Aug. 6, 2003 (JP) ............................ 2003-287250

(51) Int. Cl.
*B32B 9/00* (2006.01)
*B32B 19/00* (2006.01)
*B32B 27/32* (2006.01)
*B32B 27/36* (2006.01)

(52) U.S. Cl. ........................ 428/698; 428/220; 428/412

(58) Field of Classification Search .................. 29/600; 156/60; 343/756, 872; 427/294; 428/220, 428/412, 698
See application file for complete search history.

(56) References Cited

U.S. PATENT DOCUMENTS 4,918,049 A 4/1990 Cohn et al.
5,030,522 A * 7/1991 Luthier et al. ............... 428/698
5,192,410 A 3/1993 Ito et al.
5,472,795 A 12/1995 Atita
5,515,004 A 5/1996 Alford et al.
6,184,842 B1 * 2/2001 Leinweber et al. .......... 343/872
6,328,358 B1 12/2001 Berweiler (Continued)

FOREIGN PATENT DOCUMENTS

JP 61-253902 11/1988

(Continued)

OTHER PUBLICATIONS

Thobor et al., "Enhancement of mechanical properties of TiN/AlN multilayers by modifying the number and the quality of interfaces". Surface and Coatings Technology 124 (2000) 210-221.*

(Continued)

*Primary Examiner*—Timothy M Speer
*Assistant Examiner*—Jonathan C Langman
(74) *Attorney, Agent, or Firm*—Finnegan, Henderson, Farabow, Garrett & Dunner, LLP

(57) ABSTRACT

A molded article located in the beam path of a radar device has only a slight amount of radio transmission loss and has a metallic color. The molded article comprises a substrate and a layer of ceramic material with which the external surface of the substrate is coated. The ceramic material includes nitride ceramics, oxide ceramics, carbide ceramics, and mixtures thereof. The ceramic material includes titanium nitride and/or aluminum nitride.

9 Claims, 8 Drawing Sheets

U.S. PATENT DOCUMENTS

| | | | | |
|---|---|---|---|---|
| 7,256,746 | B2 * | 8/2007 | Kamiya et al. | 343/713 |
| 2002/0086534 | A1 | 7/2002 | Cuomo et al. | |
| 2004/0241490 | A1 * | 12/2004 | Finley | 428/655 |

FOREIGN PATENT DOCUMENTS

| | | |
|---|---|---|
| JP | 01-119103 | 5/1989 |
| JP | 06-021713 | 1/1994 |
| JP | 06-323789 | 11/1994 |
| JP | 11-060355 | 3/1999 |
| JP | 2000-049522 | 2/2000 |
| JP | 2000-159039 | 6/2000 |
| JP | 2000-344031 | 12/2000 |
| JP | 2000-344032 | 12/2000 |

OTHER PUBLICATIONS

Auger et al. "Deposition of TiN/AlN bilayers on a rotating substrate by reactive sputtering" Surface and Coatings Technology. 157 (2002) 26-33.*

Thobor et al. "Depth profiles study of n(TiN + AlN) bilayers systems by GDOES and RBS techniques" Surface and Coatings Technology, 174-175 (2003) pp. 351-359.*

Official Action in Chinese application No. 2004100705634.

Office Action dated Aug. 18, 2006, for Chinese Patent Application No. 2004-10070563.4, 2 pages.

European Office Action for EP Appl. No. 06 000 747.3-2220 dated Mar. 3, 2010.

* cited by examiner

MOLDED ARTICLE LOCATED IN THE BEAM PATH OF RADAR DEVICE, AND METHOD OF MANUFACTURING THE SAME

BACKGROUND OF THE INVENTION

1. Field of the Invention

The present invention relates to a molded article for the protection of radar equipment. In particular, the invention relates to a molded article that is located in the beam path of radar equipment mounted behind the front grill of an automobile.

2. Background Art

A radar device 100 equipped on an automobile, as shown in FIG. 10, is usually mounted behind a front grill 101. On the front grill 101, an emblem 102 of the manufacturer of the vehicle or some other distinctive ornamentation is attached. The radar device emits millimeter waves that are transmitted forward through the front grill and the emblem. Light reflected by an object is returned to the radar device through the front grill and the emblem.

The front grill and the emblem, particularly the portions thereof that are located in the beam path of the radar device, are manufactured using a material and paint that have only a small amount of radio transmission losses and which provide certain esthetic exterior. The emblem, in particular, is painted with a metallic color paint.

(Patent Document 1) JP Patent Publication (Kokai) No. 2000-159039 A (Patent Document 2) JP Patent Publication (Kokai) No. 2000-49522 A (Patent Document 3) JP Patent Publication (Kokai) No. 2000-344032 A

SUMMARY OF THE INVENTION

JP Patent Publication (Kokai) Nos. 2000-159039 and 2000-344032 disclose that an indium film is deposited on the front grill. JP Patent Publication (Kokai) No. 2000-49522 discloses that a ceramic film of silicon dioxide is provided on the emblem or radome.

While the indium film, which provides a metallic color, is suitable for the coating of the emblem or the like, it has a large radio transmission loss. Therefore, if it is mounted in front of the radar device, the beam from the radar device is attenuated. An indium film easily peels off and lacks in durability. Moreover, indium is a metal and is therefore subject to potential corrosion.

The ceramic film made of silicon dioxide has excellent durability and is used for the protection of a film or paint. However, it is colorless and cannot provide esthetic exterior, such as that of a metallic color.

It is an object of the invention to provide a molded article located in the beam path of a radar device that has only a small amount of radio transmission loss.

It is another object of the invention to provide a molded article located in the beam path of the radar device that has a luminous color.

In accordance with the invention, a layer of a ceramic material is provided on the external surface of a substrate. The ceramic material includes nitride ceramics, oxide ceramics, carbide ceramics, and mixtures thereof. The ceramic material includes titanium nitride and/or aluminum nitride.

In accordance with the invention, a molded article with only a small amount of radio transmission loss is provided that is located in the beam path of the radar device.

In accordance with the invention, a molded article with a luminous color is provided that is located in the beam path of the radar device.

DESCRIPTION OF THE PREFERRED EMBODIMENTS

Figure 1:
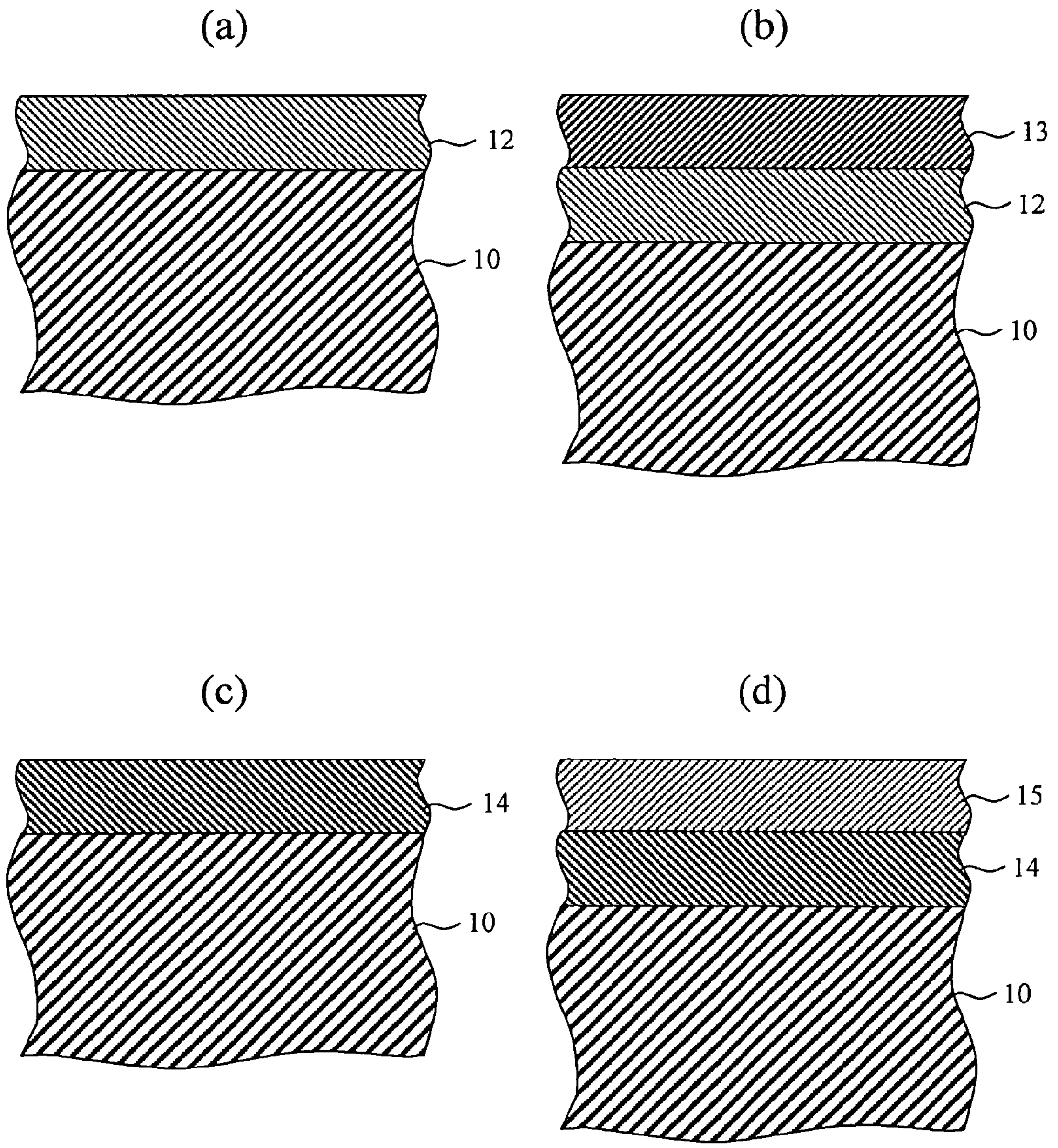
FIG. 1 shows cross sections of the surface of a molded article according to the invention that is located in the beam path of a radar device.
Figure 2:
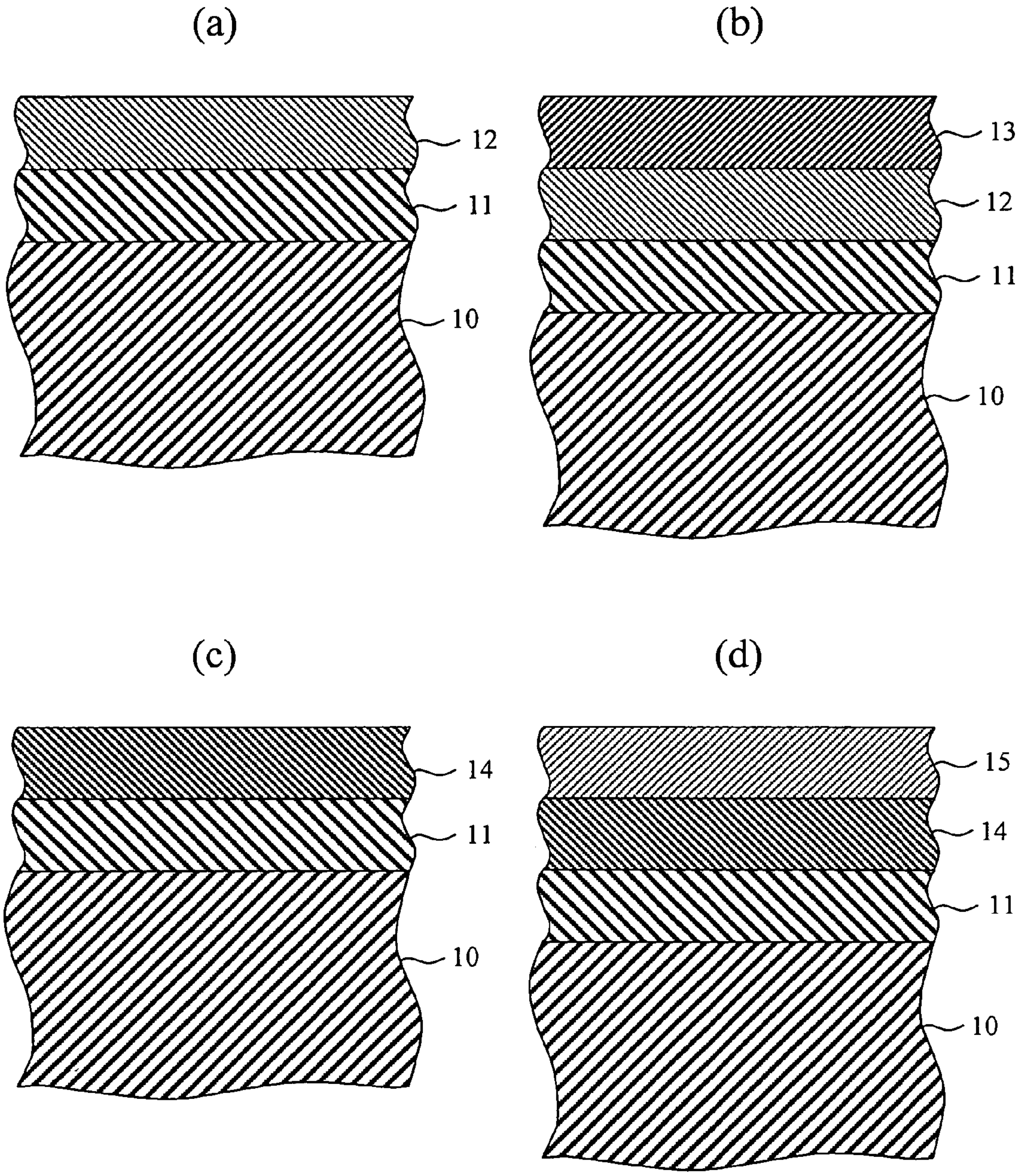
FIG. 2 shows cross sections of the surface of a molded article according to the invention that is located in the beam path of a radar device.

FIGS. 1 and 2 show cross sections of the surface of a molded article according to the invention that is located in the beam path of a radar device. FIG. 1(*a*) shows a first example of the invention. In this example, the molded article comprises a substrate 10 and a layer 12 of ceramic material that is disposed on the substrate 10. The ceramic material layer 12 may be made of nitride ceramics, oxide ceramics, or carbide ceramics. Examples of the nitride ceramics include titanium nitride TiN, aluminum nitride AlN, chromium nitride CrN, silicon nitride $Si_3N_4$, iron nitride FeN, gallium nitride GaN, and zirconium nitride ZrN. Examples of the carbide ceramics include silicon carbide SiC, titanium carbide TiC, zirconium carbide ZrC, boron carbide $B_4C$, and tungsten carbide WC.

In the present example, the ceramic material layer 12 is preferably made from titanium nitride TiN or aluminum nitride AlN.

FIG. 1(*b*) shows a second example of the invention. In this example, the molded article comprises a substrate 10, a layer 12 of a first ceramic material, and a layer 13 of a second ceramic material, the two layers being disposed on the substrate. The two ceramic material layers 12 and 13 are made from two different ceramic materials selected from a group of ceramic materials consisting of the aforementioned nitride ceramics, oxide ceramics, and carbide ceramics. Preferably, however, titanium nitride TiN and aluminum nitride AlN are used.

More preferably, the lower layer 12 of the first ceramic material is a titanium nitride TiN layer, and the upper layer 13 of the second ceramic material is an aluminum nitride AlN layer. By thus forming the aluminum nitride AlN layer, which has transparent and iridescent interference colors, on the titanium TiN layer, which exhibits a metallic color, an aesthetic exterior of metallic and iridescent interference colors can be obtained.

FIG. 1(*c*) shows a third example of the invention. In this example, the molded article comprises a substrate 10 and a mixed-ceramics material layer 14 disposed on the substrate 10. The mixed-ceramics material layer 14 is made from a mixture of two or more ceramic materials. The ceramic materials for forming the mixture may be selected from the examples mentioned above, of which titanium nitride TiN and aluminum nitride AlN are preferable.

FIG. 1(*d*) shows a fourth example of the invention. In this example, the molded article comprises a substrate 10, a first mixed-ceramic material layer 14 on the substrate 10, and a second mixed-ceramic material layer 15. The two mixed-ceramic material layers 14 and 15 have different ceramic material compositions. Each mixture may be made of the examples of the ceramic materials mentioned above. Preferably, however, titanium nitride TiN and aluminum nitride AlN are used. In this case, the respective contents of titanium nitride TiN and aluminum nitride AlN are different in the two mixture layers 14 and 15.

The ceramic material layers 12 and 13 and the mixed-ceramic material layers 14 and 15 may be formed by sputtering. Each layer in the ceramic material layers 12 and 13 and in the mixed-ceramic material layers 14 and 15 preferably has a thickness from 0.1 nm to 1000 nm, or more preferably, from 10 nm to 500 nm.

By suitably selecting the type of ceramic materials used in the ceramic material layers 12 and 13 and the mixed-ceramic material layers 14 and 15 and the thickness of each layer, a desired color can be exhibited.

The substrate 10 is made of a material that has only a small amount of radio transmission loss and excellent dielectric properties. The dielectric properties include the dielectric constant $\epsilon'$ and the dielectric loss tan $\delta$. The substrate 10 is made of a transparent resin, preferably polycarbonate.

With reference to FIG. 2, another example of the invention is described. FIG. 2(*a*) shows a fifth example of the invention. In this example, the molded article comprises a substrate 10, an undercoat layer 11 on the substrate 10, and a ceramic material layer 12 on the undercoat layer 11. The molded article in the present example is different from the example of FIG. 1(*a*) in that there is provided the undercoat layer 11. The undercoat layer 11 is made of a paint that can enhance the tone of color exhibited by the ceramic material layer 12, and a desired color is selected for the paint. In the case where the ceramic material layer 12 exhibits a metallic color like that of titanium nitride TiN, the undercoat layer 11 may be black paint.

FIG. 2(*b*) shows a sixth example of the invention. In this example, the molded article comprises a substrate 10, an undercoat layer 11 disposed on the substrate 10, a first ceramic material layer 12 disposed on the undercoat layer 11, and a second ceramic material layer 13. The molded article of this example differs from the example of FIG. 1(*b*) in that there is provided the undercoat layer 11.

FIG. 2(*c*) shows a seventh example of the invention. In this example, the molded article comprises a substrate 10, an undercoat layer 11 disposed on the substrate 10, and a mixed-ceramic material layer 14 disposed on the undercoat layer 11. This molded article differs from the example of FIG. 1(*c*) in that there is provided the undercoat layer 11. FIG. 2(*d*) shows an eighth example of the invention, in which the molded article comprises a substrate 10, an undercoat layer 11 disposed on the substrate 10, a first mixed-ceramic material layer 14, and a second mixed-ceramic material layer 15, the first and second mixed-material layers being disposed on the undercoat layer 11. The molded article in this example differs from the example of FIG. 1(*d*) in that there is provided the undercoat layer 11.

In the following, the results of experiments conducted to compare the examples of the invention with the examples of the prior art will be described.

Figure 3:
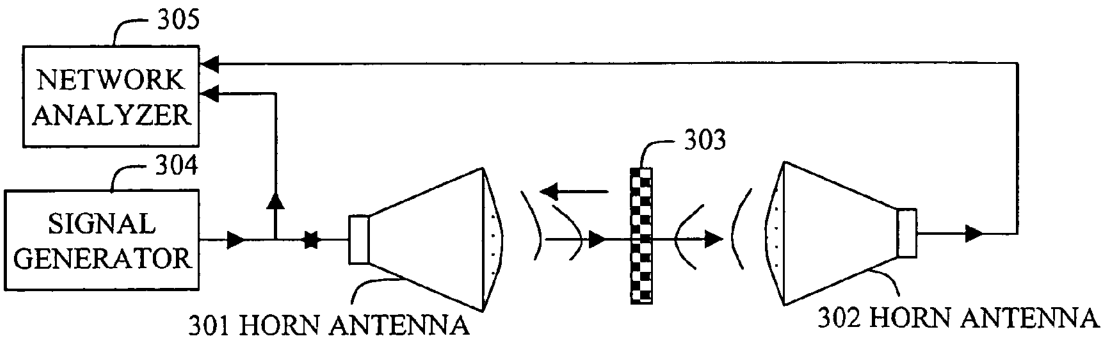
FIG. 3 illustrates a method of radio property test.

With reference to FIG. 3, a radio property test based on a free space method conducted by the inventors is described. In the radio property test, a sample 303 measuring 50×50 mm was disposed between two horn antennas 301 and 302 faced with each other. One of the horn antennas, 301, was adapted to transmit millimeter waves generated by a signal generator 304 and receive the millimeter waves reflected by the sample 303. The other horn antenna, 302, was adapted to receive the millimeter waves that passed through the sample 303. A network analyzer 305 was adapted to receive an incident beam produced by the signal generator 304, a reflected beam obtained from the horn antenna 301 on the incident side, and a transmission beam obtained from the horn antenna 302 on the transmitted side. The transmission loss and the dielectric properties were measured using the network analyzer 305. Five samples were prepared, as shown in Table 1.

(1) A substrate made of polycarbonate resin. This is the substrate per se and it has no paint or films provided on it. This will be referred to as Sample 0.

(2) A titanium nitride film according to the invention was formed on the substrate. One film with the titanium nitride film thickness of 100 nm will be referred to as Sample 1, and another with the film thickness of 200 nm will be referred to as Sample 2. The titanium nitride films were formed by sputtering.

(3) An indium film was formed on the substrate according to a conventional technique. One indium film with the thickness of 10 nm will be referred to as Sample 3, while another with the film thickness of 30 nm will be referred to as Sample 4. The indium films were formed by vapor deposition.

TABLE 1

| | Materials | Method of deposition | Film thickness | Appearance | Sample name |
|---|---|---|---|---|---|
| Substrate | Polycarbonate | | 0 | Transparent | Sample 0 |
| Example of invention | Substrate + TiN | Sputtering | 100 nm | Luminous dark silver (somewhat transparent) | Sample 1 |
| Example of invention | " | " | 200 nm | Luminous dark silver | Sample 2 |
| Example of prior art | Substrate + In | Vacuum deposition | 10 nm | Luminous silver | Sample 3 |
| Example of prior art | " | Vacuum deposition | 30 nm | Luminous silver | Sample 4 |

Figure 4:
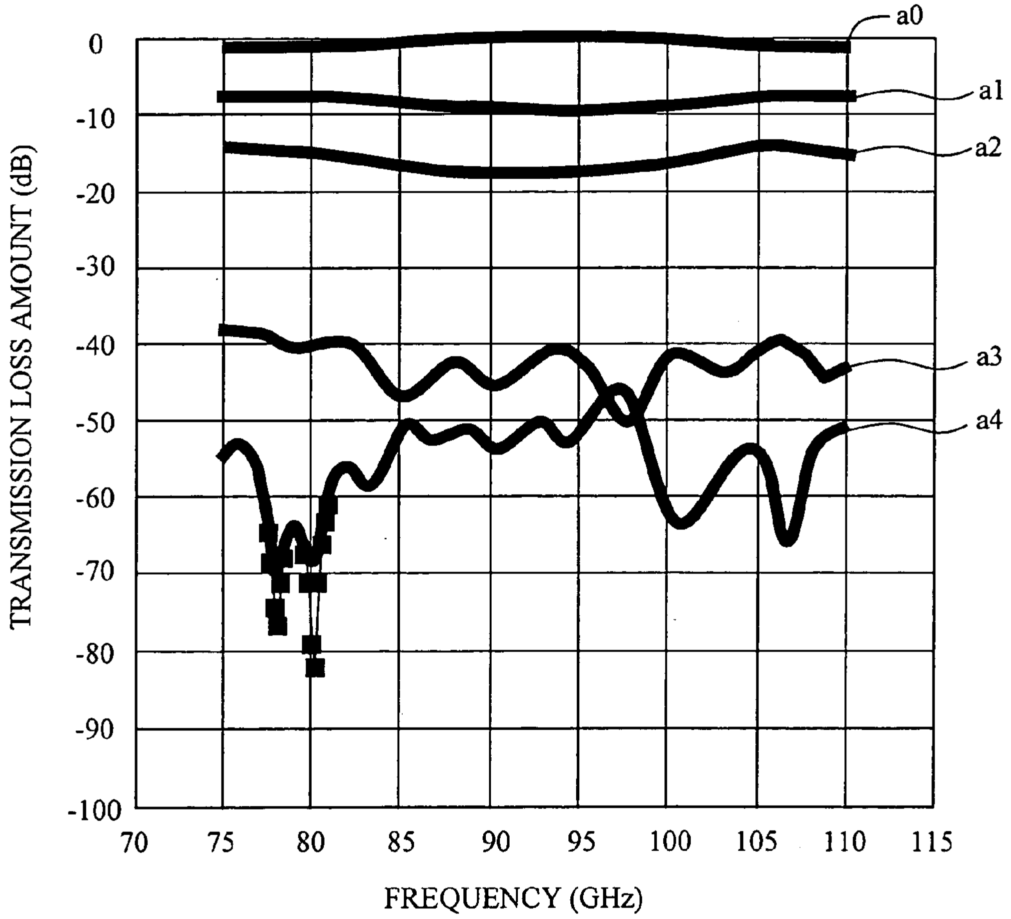
FIG. 4 shows the transmission loss of each sample determined by the radio property test.
Figure 5:
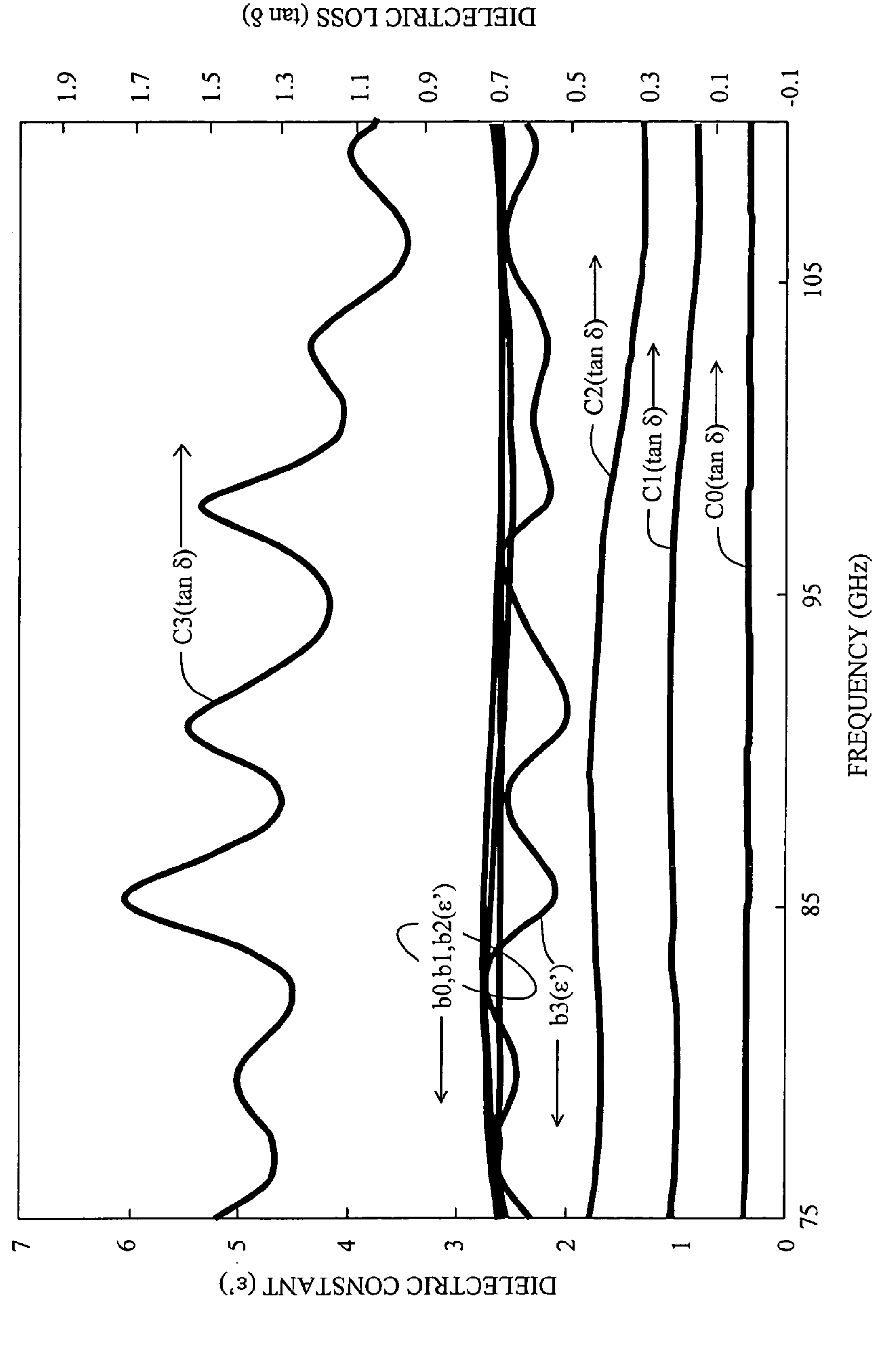
FIG. 5 shows the dielectric properties of each sample determined by the radio property test.

The result shows that in the examples of the invention, a desired color can be obtained with luminance from transparent to silver by adjusting the thickness of the titanium nitride film.

conduction loss is more dominant than the dielectric loss, as will be seen by comparing curve a3 of FIG. 4 with curve c3 of FIG. 5. Three more samples were then prepared, as shown in Table 2.

TABLE 2

| | Materials | Method of deposition | Film thickness | Appearance | Sample name |
|---|---|---|---|---|---|
| Substrate | Polycarbonate | | 0 | Transparent | Sample 10 |
| Example of invention | Substrate + AlN | Sputtering | 50 nm | Transparent (with some interference color) | Sample 11 |
| Example of invention | " | " | 100 nm | Transparent (with some interference color) | Sample 12 |

FIG. 4 shows the transmission loss (dB) of each sample determined from the result of the radio property test. Each sample was irradiated with a millimeter wave in a 75-110 GHz band. Curves a0, a1, a2, a3, and a4 indicate the measurement result of the transmission loss for Samples 0, 1, 2, 3, and 4, respectively. As shown in the figure, the transmission losses of Samples 1 and 2 of the invention (curves a1 and a2) are sufficiently small as compared with those of Samples 3 and 4 of the prior art (curves a3 and a4). The transmission loss of Sample 0 (curve a2), which is the substrate made of polycarbonate, can be considered to be substantially zero. The transmission loss is larger for greater film thickness, as will be seen by comparing the transmission losses of Sample 1 (curve a1) and Sample 2 (curve a2), for example.

FIG. 5 shows the dielectric properties of each sample determined from the result of the radio property test. Each sample was irradiated with a millimeter wave in the 75-110 GHz band. The dielectric properties include the dielectric constant ∈' and the dielectric loss tan δ, of which the former will be considered first in the following. Curves b0, b1, b2, and b3 indicate the measurement results of the dielectric constant ∈' for Samples 0, 1, 2, and 3. For Sample 4, the dielectric constant could not be measured. The dielectric constant ∈' of Samples 1 and 2 (curves b1 and b2) of the invention are substantially equal to the dielectric constant ∈' of Sample 0 (curve b0), which was the substrate. Namely, it is seen that the molded articles having the films formed in accordance with the invention are dielectric matter similar to the polycarbonate substrate. The dielectric constant ∈' of Sample 3 (curve b3) of the prior art is smaller than that of Samples 0, 1, and 2 (curves b0, b1, and b2). Because indium is basically a metal, it can be thought that, by depositing a thin indium film on the surface of the polycarbonate substrate, which is dielectric material, there is obtained a kind of semiconductor material.

Now, the dielectric loss tan δ will be considered. Curves c0, c1, c2, and c3 indicate the measurement results of the dielectric loss tan δ for Samples 0, 1, 2, and 3. For Sample 4, the dielectric loss tan δ could not be measured. The dielectric loss tan δ decreases in the order of Samples 0, 1, 2, and 3 (curves c0, c1, c2, and c3). Namely, the dielectric loss tan δ of Sample 0 (curve c0), which is the substrate, is the smallest, the dielectric losses tan δ of Samples 1 and 2 (curves c1 and c2) of the invention are larger, and the dielectric loss tan δ of Sample 3 (curve c3) of the prior art is the largest.

It will be seen that the transmission losses shown in FIG. 4 correspond to the dielectric losses shown in FIG. 5. With regard to Sample 3 of the prior art, it can be considered that the (1) A substrate made of polycarbonate resin. This is the substrate per se, and it does not have any paint or films provided thereon. This is referred to as Sample 10, which is identical to Sample 0 shown in Table 1.

(2) An aluminum nitride film according to the invention was formed on the substrate. One with an aluminum nitride film thickness of 50 nm is designated as Sample 11, and another with a film thickness of 100 nm is designated as Sample 12. The aluminum nitride films were formed by sputtering.

Figure 6:
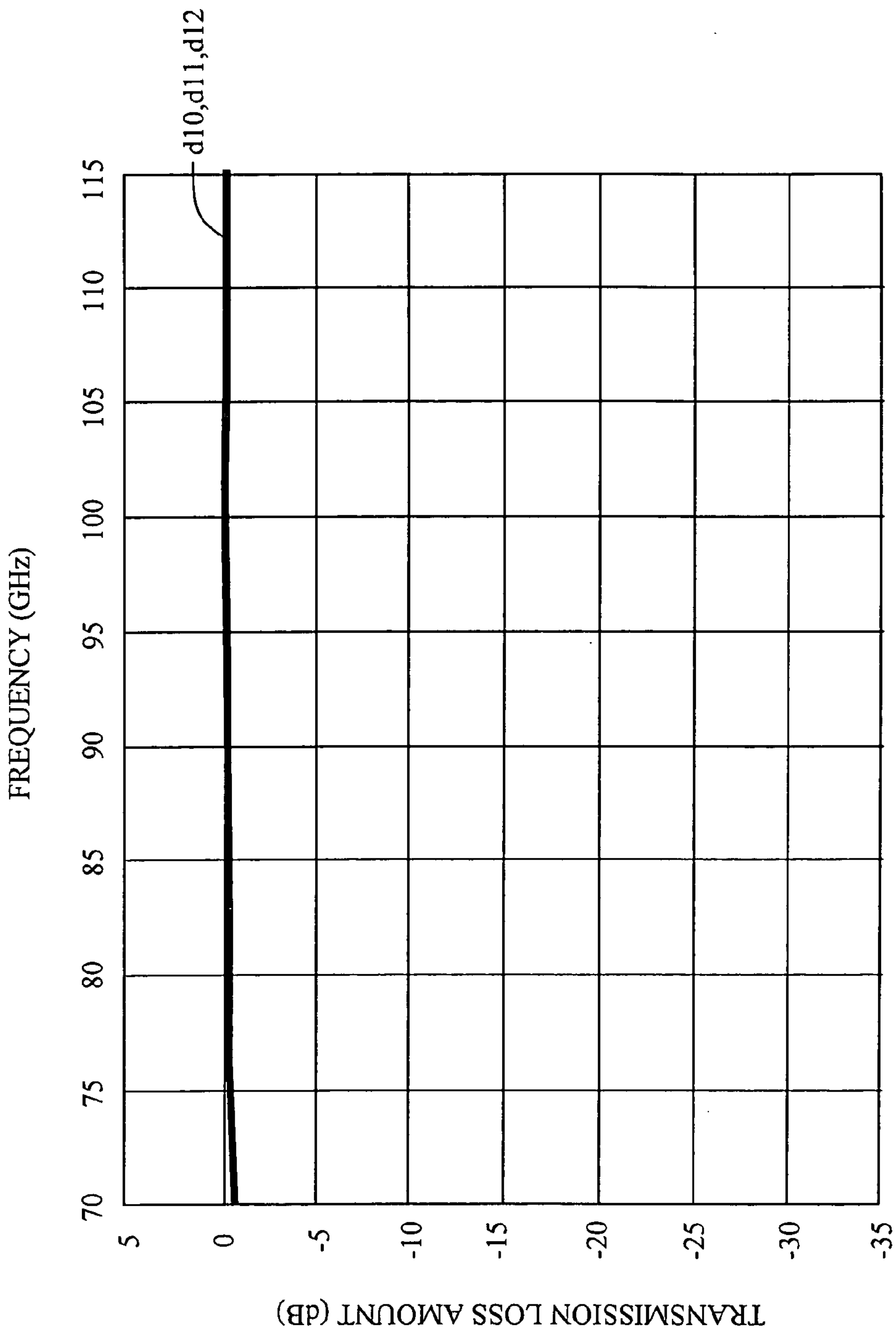
FIG. 6 shows the transmission loss of each sample determined from the result of a second radio property test.

FIG. 6 shows the transmission loss of each sample determined from the results of a second radio property test. Each sample was irradiated with a millimeter wave in the 75-110 GHz band. Curves d10, d11, and d12 indicate the measurement results of the transmission loss for Samples 10, 11, and 12. As shown, the transmission losses of Samples 11 and 12 according to the invention can be considered to be substantially zero, as is the transmission loss of Sample 10, which is the polycarbonate substrate.

Figure 7:
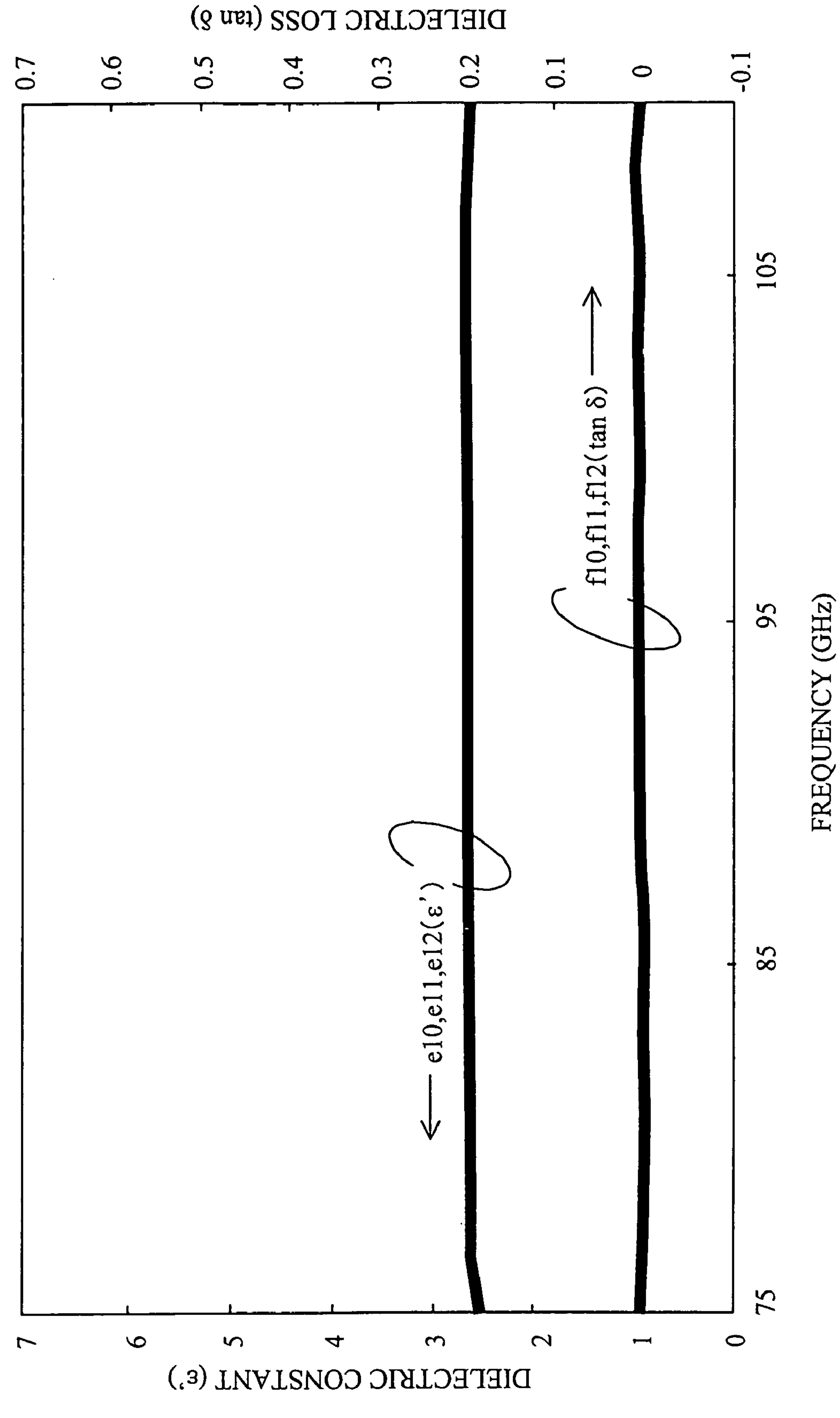
FIG. 7 shows the transmission loss of each sample determined from the result of a second radio property test.

FIG. 7 shows the dielectric properties of each sample determined from the results of the second radio property test, which include the dielectric constant ∈' and the dielectric loss tan δ. Each sample was irradiated with a millimeter wave in the 75-110 GHz band. Curves e10, e11, and e12 indicate the measurement result of the dielectric constant ∈' for Samples 10, 11, and 12. The three curves e10, e11, and e12 are superposed upon one another and are substantially identical. Namely, the dielectric constants ∈' of Samples 11 and 12 are equal to the dielectric constant ∈' of Sample 10, which is the substrate. Similarly, curves f10, f11, and f12 indicate the measurement result of the dielectric loss tan δ for Samples 10, 11, and 12. The three curves f10, f11, and f12 are superposed upon one another and are substantially identical. Namely, the dielectric losses tan δ of Samples 11 and 12 of the invention are equal to the dielectric loss tan δ of Sample 10, which is the substrate.

Figure 8:
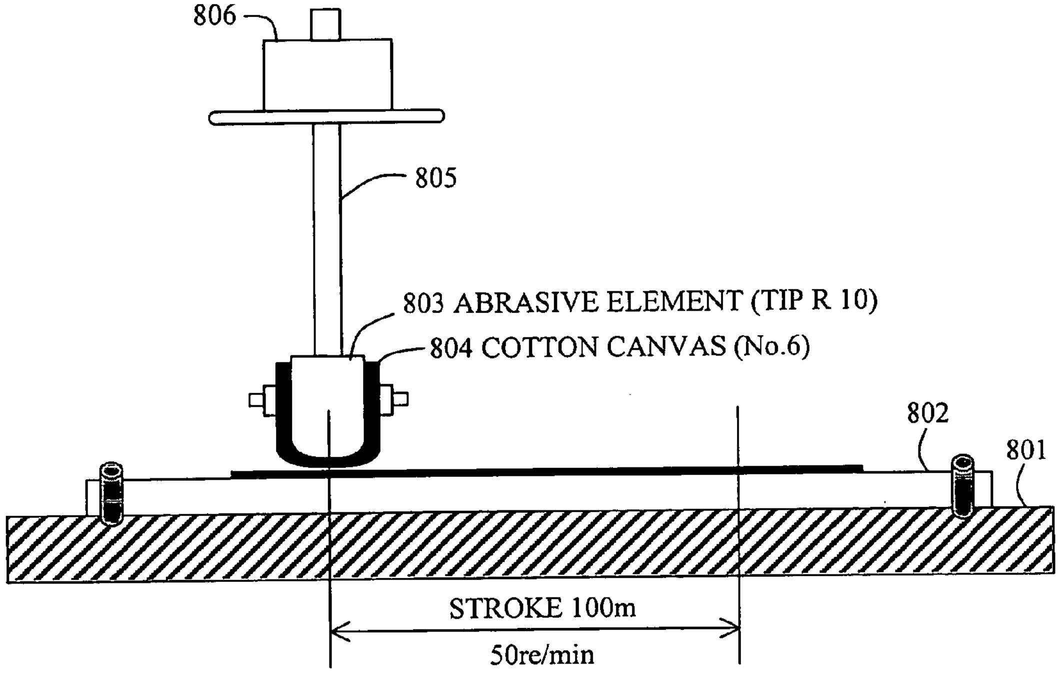
FIG. 8 illustrates a method of abrasion resistance test.

With reference to FIG. 8, an abrasion resistance test conducted by the inventors is described. FIG. 8 shows a method of surface abrasion test. As shown, a sample 802 was secured on a sample base 801, and the surface of the sample 802 was scrubbed by an abrasive element 803. To the abrasive element 803, a weight 806 was attached via a support 805. The force applied to the tip of the abrasive element 803 was 9.8 N. The spherical surface of the tip of the abrasive element 803 had a radius of 10 mm and was wound with a cotton canvas (No. 6) 804.

The abrasive element 803 had a stroke of 100 mm and it was moved at a rate of 50 reciprocations per minute. The number of reciprocations the abrasive element had executed when the coating on the surface of the sample started to peel off was measured. The peeling of the film was identified visually. Sample 1 of the invention and Sample 4 of the prior art were prepared and then an abrasion test was conducted.

The results are shown in Table 3.

TABLE 3

| | Materials | Method of deposition | Film thickness | Test result | Sample name |
|---|---|---|---|---|---|
| Example of invention | Substrate + TiN | Sputtering | 100 nm | Peeling started at 40 to 55 reciprocations | Sample 1 |
| Example of prior art | Substrate + In | Vacuum deposition | 30 nm | Peeling started at 3 to 5 reciprocations | Sample 4 |

As will be seen from Table 3, Sample 1 of the invention has higher abrasion resistance than Sample 4 of the prior art.

Figure 9:
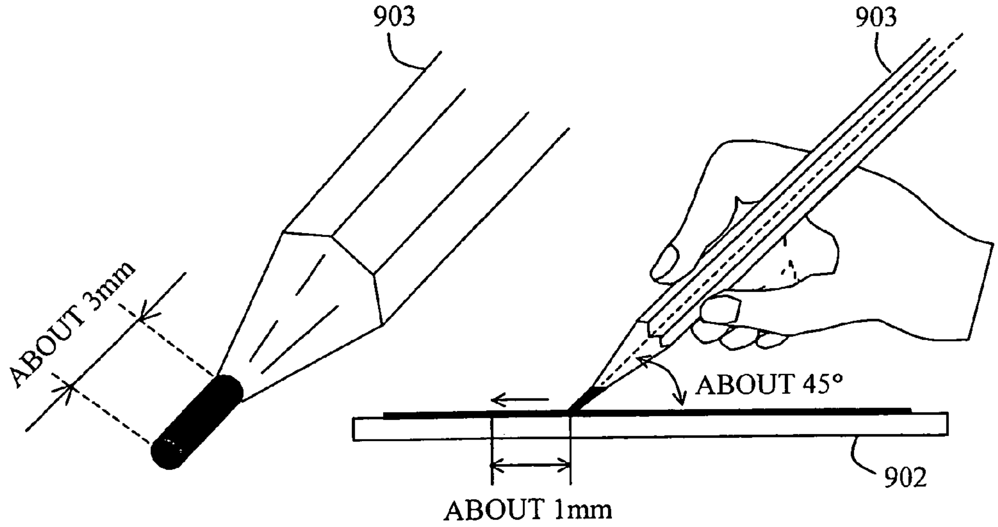
FIG. 9 illustrates a method of hardness test.
Figure 10:
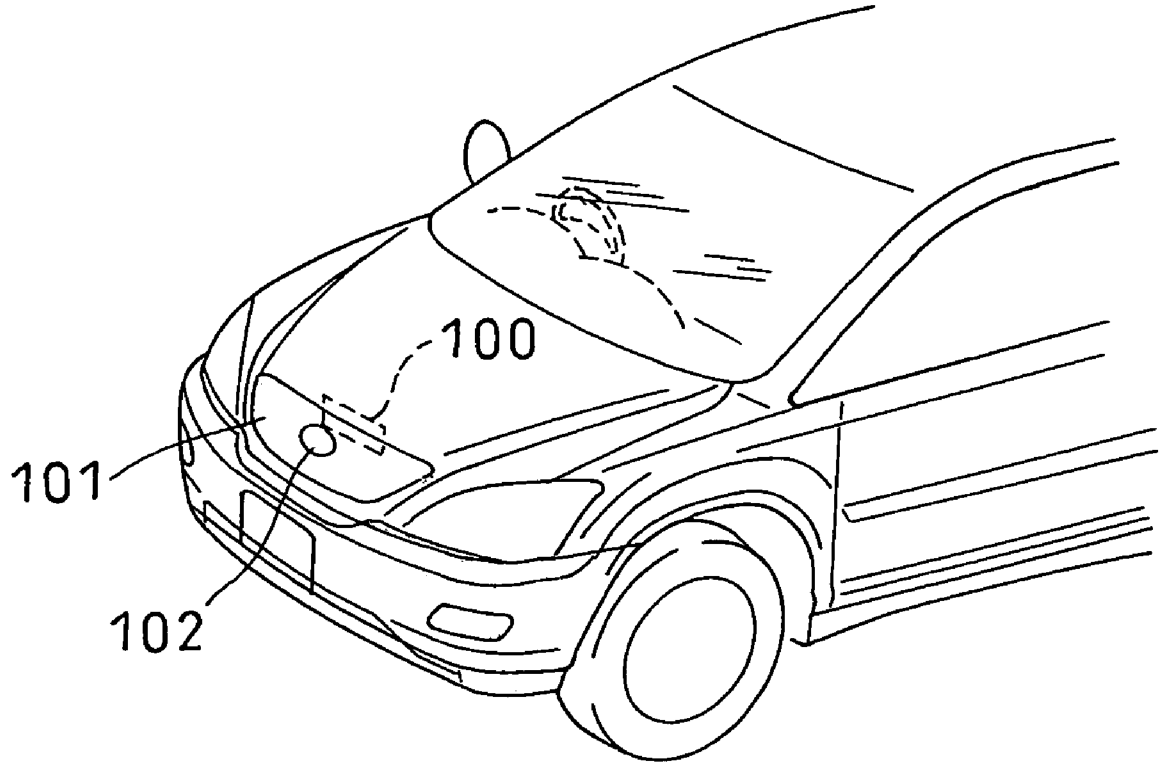
FIG. 10 shows the arrangement of a conventional molded article.

With reference to FIG. 9, a hardness test conducted by the inventors is described. FIG. 9 shows a method of a pencil scratch test. As shown, the surface of a sample 902 was scratched using a pencil 903 with a lead tip of about 3 mm length. The pencil 903 was gripped by the right hand such that an angle of about 45° was formed between the surface and the pencil 903. The pencil was then pressed onto the surface of the sample 902 just strongly enough not to break the lead and moved forward by approximately 1 cm at a constant speed. Pencils of various levels of hardness were used and the density symbols of the pencils with which the peeling was produced were recorded. Density symbol 9H indicates the maximum hardness, and 6B indicates the minimum hardness.

The measurement results are shown in Table 4.

TABLE 4

| | Materials | Method of deposition | Film thickness | Test result | Sample name |
|---|---|---|---|---|---|
| Example of invention | Substrate + TiN | Sputtering | 100 nm | Peeled With HB; Did not peel with B | Sample 1 |
| Example of prior art | Substrate + In | Vacuum deposition | 30 nm | Peeled with 5B; Did not peel with 6B | Sample 4 |

As will be seen from Table 4, Sample 1 of the invention had higher hardness than Sample 4 of the prior art.

The molded article according to the invention that is located in the beam path of the radar device thus has high abrasion resistance and hardness. Therefore, the advantage can be obtained that there is no need to coat the surface of the molded article with a protective film of silicon dioxide, as required in the prior art. Optionally, however, a transparent protective film may be further provided on the surface of the molded article shown in FIGS. 1 and 2.

While the invention has been particularly shown and described with reference to preferred examples thereof, it will be understood by those skilled in the art that various changes can be made therein without departing from the scope of the appended claims.

What is claimed is:

1. A molded article comprising: a substrate and at least one layer of a ceramic material with which the substrate is coated, said molded article being located in a beam path of a radar device, wherein a paint layer of a color that enhances the color exhibited by said ceramic material is disposed between said substrate and said layer of said ceramic material, and wherein said ceramic material comprises a layer of titanium nitride and a layer of aluminum nitride, said aluminum nitride layer being transparent and having iridescent interference colors, said titanium nitride layer having a metallic color, and said article having an exterior of metallic and iridescent interference colors.

2. The molded article according to claim 1, wherein each of the titanium nitride layer and the aluminum nitride layer is formed by sputtering.

3. The molded article according to claim 1, wherein said substrate is formed from a transparent resin that has only a small amount of radio transmission loss.

4. The molded article according to claim 1, wherein said substrate is formed from a transparent resin that has only a small amount of dielectric loss.

5. The molded article according to claim 1, wherein said substrate is formed from polycarbonate.

6. A molded emblem or front grill provided on a vehicle including a radar device, comprising: a substrate, a titanium nitride layer disposed directly on the substrate, and an aluminum nitride layer formed on the titanium nitride layer, said molded emblem or front grill being located in a radar beam path of the radar device of the vehicle, said aluminum nitride layer being transparent and having iridescent interference colors, said titanium nitride layer having a metallic color, and said molded emblem or front grill having an exterior of metallic and iridescent interference colors, wherein said substrate is formed from a transparent resin that has only a small amount of radio transmission loss.

7. The molded emblem or front grill according to claim 6, wherein said transparent resin is polycarbonate.

8. A molded emblem or front grill provided on a vehicle including a radar device, comprising: a substrate, a titanium nitride layer disposed directly on the substrate, and an aluminum nitride layer formed on the titanium nitride layer, said molded emblem or front grill being located in a radar beam path of the radar device of the vehicle, said aluminum nitride layer being transparent and having iridescent interference colors, said titanium nitride layer having a metallic color, and said molded emblem or front grill having an exterior of metallic and iridescent interference colors, wherein said substrate is formed from a transparent resin that has only a small amount of dielectric loss.

9. The molded emblem or front grill according to claim 8, wherein said transparent resin is polycarbonate.

* * * * *